(12) United States Patent
Niina et al.

(10) Patent No.: US 8,259,374 B2
(45) Date of Patent: Sep. 4, 2012

(54) IMAGE PROCESSING APPARATUS AND IMAGE FORMING APPARATUS

(75) Inventors: Hiroshi Niina, Kanagawa (JP); Ayumi Onishi, Kanagawa (JP); Hiroyoshi Uejo, Kanagawa (JP); Kazuhiro Ohya, Kanagawa (JP); Katsuya Koyanagi, Kanagawa (JP); Zhenrui Zhang, Kanagawa (JP); Chihiro Matsuguma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 360 days.

(21) Appl. No.: 12/570,793

(22) Filed: Sep. 30, 2009

(65) Prior Publication Data
US 2010/0225984 A1    Sep. 9, 2010

(30) Foreign Application Priority Data
Mar. 5, 2009    (JP) ................ 2009-052569

(51) Int. Cl.
H04N 1/46    (2006.01)
(52) U.S. Cl. .................................... 358/538
(58) Field of Classification Search .......... None
See application file for complete search history.

(56) References Cited

U.S. PATENT DOCUMENTS
7,355,744 B2 * 4/2008 Hattori ................... 358/1.2
2004/0136609 A1    7/2004 Ichikawa et al.
2006/0262982 A1 * 11/2006 Matsumoto et al. .......... 382/238
2007/0025617 A1 *  2/2007 Dai et al. .................. 382/180

FOREIGN PATENT DOCUMENTS
JP    08-009148 A    1/1996
JP    2004-146997 A    5/2004
JP    2007-129557 A    5/2007

OTHER PUBLICATIONS

Japanese Office Action dated Jan. 25, 2011 for corresponding Japanese patent application No. 2009-052569.

* cited by examiner

Primary Examiner — Marivelisse Santiago Cordero
Assistant Examiner — John Wallace
(74) Attorney, Agent, or Firm — Sughrue Mion, PLLC

(57) ABSTRACT

An image processing apparatus includes: a first determination unit that determines whether each of an image regions is for a vector image; a color number counting unit that counts the number of colors in the pixels of high-resolution image data; a frequency counting unit that counts a number of times where the difference between the colors of each of the pixels in the high-resolution image data and the colors of at least one pixel located around each of those pixels is greater than or equal to a threshold; a second determination unit that determines that the image region is not an image region for a vector image; and a generation unit that generates image data in which a process for rendering images in the image regions determined by the first determination unit to be image regions for vector images is defined by numerical values or numerical formulas.

6 Claims, 3 Drawing Sheets

| COLOR CHANGE NUMBER \ SECOND COMPOSITION COLOR NUMBER | <Th1 | ≧Th1 |
|---|---|---|
| <Th2 | VECTOR IMAGE | PHOTOGRAPHIC IMAGE |
| ≧Th2 | PHOTOGRAPHIC IMAGE | PHOTOGRAPHIC IMAGE |

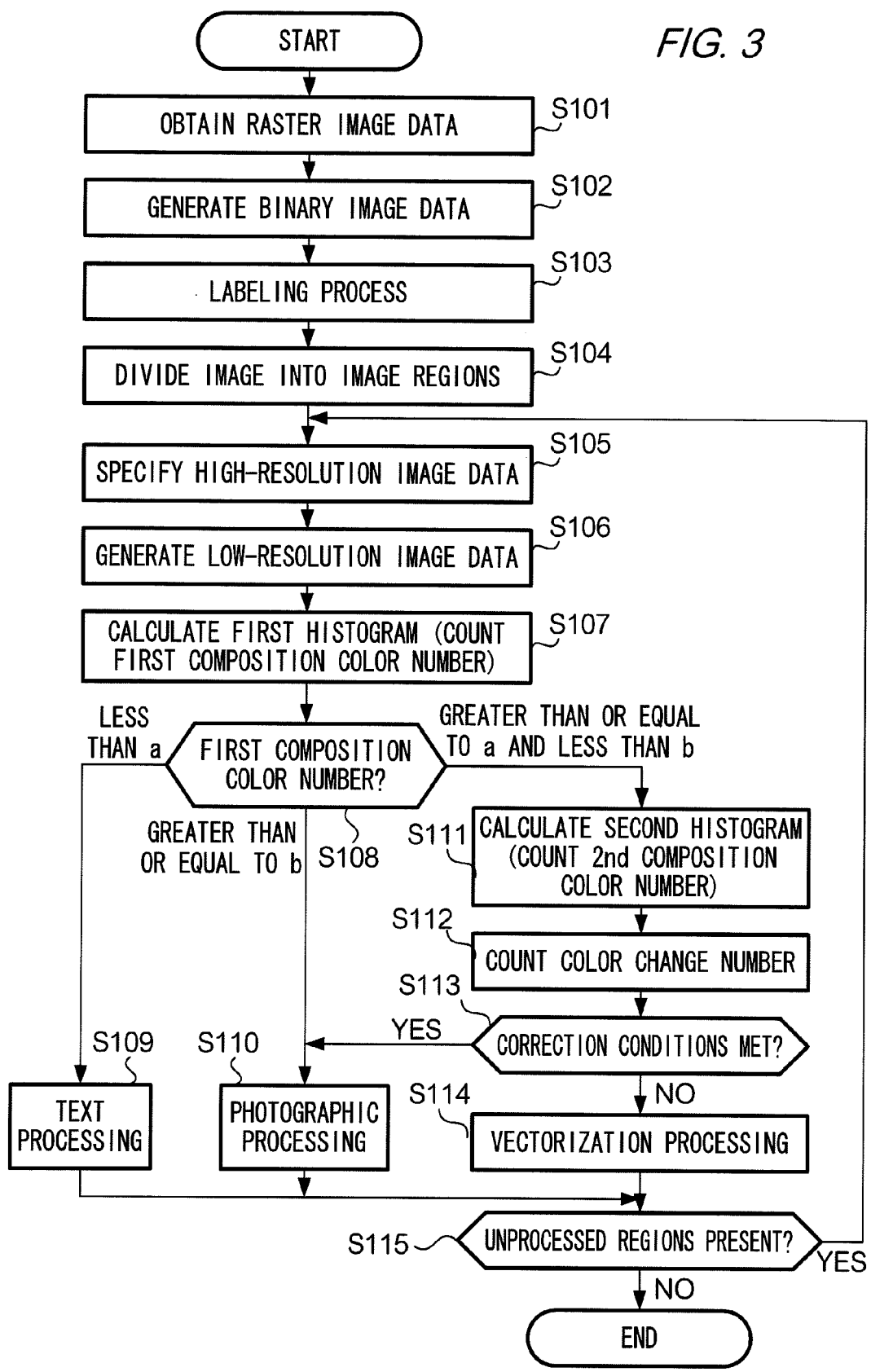

IMAGE PROCESSING APPARATUS AND IMAGE FORMING APPARATUS

CROSS-REFERENCE TO RELATED APPLICATIONS

This application claims priority under 35 USC 119 from a Japanese patent application No. 2009-052569 filed on Mar. 5, 2009.

BACKGROUND

1. Technical Field

The present invention relates to an image processing apparatus and an image forming apparatus.

2. Related Art

There are two types of systems used by a computer or the like to represent images; one is the raster system, and the other is the vector system. Converting an image represented by the raster system into an image represented by the vector system enables the easy reuse of the elements within the image, including lines, surfaces, text, and the like.

SUMMARY

An exemplary embodiment of the present invention provides a technique for correcting the determination of the attributes of an image that is to be rendered in an image region, on an attribute-by-attribute basis, when converting the system by which that image is represented from the raster system to the vector system.

According to one aspect of the invention, there is provided an image processing apparatus including: an obtaining unit that obtains original image data representing a color of each pixel included in an image; a dividing unit that divides the image represented by the original image data obtained by the obtaining unit into a plurality of image regions through a labeling process; a low-resolution image data generation unit that generates low-resolution image data representing the image at a lower resolution than the resolution of the original image data; a first determination unit that determines whether each of the image regions divided by the dividing unit is an image region for a vector image, based on a characteristic amount of the image represented by the low-resolution image data generated by the low-resolution image data generation unit, the vector image being an image where the process for rendering the image is defined by numerical values or numerical formulas; a color number counting unit that, in a case where the first determination unit has determined that the image region is an image region for a vector image, counts the number of colors in the pixels of high-resolution image data representing the image included in the image region, the high-resolution image data having a resolution that is higher than the low-resolution image data; a frequency counting unit that, in a case where the first determination unit has determined that the image region is an image region for a vector image, counts a number of times where the difference between the colors of each of the pixels in the high-resolution image data and the colors of at least one pixel located around each of those pixels is greater than or equal to a threshold; a second determination unit that, in a case where at least one of the number counted by the color number counting unit and the number of times counted by the frequency counting unit in the image region determined by the first determination unit to be an image region for a vector image is greater than a threshold, determines that the image region is not an image region for a vector image; and a generation unit that generates image data in which a process for rendering images in the image regions determined by the first determination unit to be image regions for vector images, but excluding the image regions determined by the second determination unit to not be image regions for vector images, is defined by numerical values or numerical formulas.

BRIEF DESCRIPTION OF THE DRAWINGS

An exemplary embodiment of the present invention will be described in detail based on the following figures, wherein:

FIG. 3 shows a flowchart illustrating the flow of operations performed by a CPU in the image processing unit.

DETAILED DESCRIPTION

1. Definitions

In the following exemplary embodiment, "image region" refers to a region within an image in which a picture is rendered.

"Region image" refers to an image that is to be rendered within an image region.

"Text image" refers to an image represented within an image region by combining values associated with each of linguistic units, also known as "character codes", with font information indicating the size, shape, and so on thereof.

"Raster system" refers to a system in which an image is divided into units called pixels, arranged in grid form, and color information (hue, tone, and so on) represented by each of those pixels is denoted on a pixel-by-pixel basis.

"Raster image" refers to an image represented by the raster system.

"Resolution" refers to a value, in a raster image, showing the number of pixels disposed per unit length. Here, the unit length is, for example, the inch, and in such a case, the unit of resolution is "dpi (dot per inch)", which shows the number of pixels per inch.

"Vector information" is information in which each of the elements, such as lines, surfaces, text, and so on, that are to be rendered are defined within an abstract space, and the processes for rendering each element are denoted as numerical values.

"Vector system" refers to a system by which elements defined using vector information are rendered on an element-by-element basis. To be more specific, the vector system is a system in which the coordinates of the origin and end points, the color, the width, curvatures, and so on of a line, the colors of surfaces enclosed by lines, character codes and character attributes (size and font), and so on are represented as numerical values and numerical formulas.

"Vector image" refers to an image represented by the vector system.

"Rasterizing" refers to converting a vector image into a raster image. If the size and resolution of an image are set, rasterizing can be performed by setting the color information of each pixel in accordance with rendering information included within the vector image.

"Vectorizing" refers to converting a raster image into a vector image.

"Photographic image" refers to a raster image obtained by shooting primarily natural objects according to an optical method, as well as a similar image considered to be a raster image, and is an image that is difficult to vectorize.

2. Configuration

A configuration of an image forming apparatus 10, serving as an exemplary embodiment of the present invention, will be described.

Figures 1, 4:
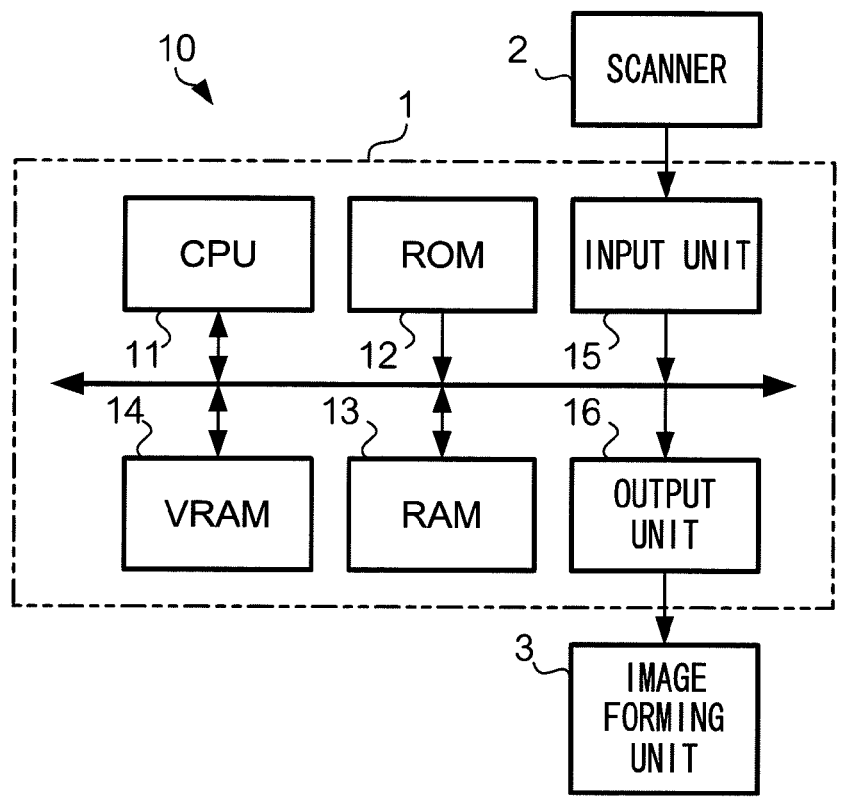
FIG. 1 shows a block diagram illustrating the overall configuration of an image forming apparatus.
FIG. 4 shows a diagram illustrating pre-stored correction conditions.

FIG. 1 shows a block diagram illustrating the overall configuration of the image forming apparatus 10. As shown in FIG. 1, the image forming apparatus 10 includes an image processing unit 1, a scanner 2, and an image forming unit 3. The area surrounded by the double-dot-dash line shown in FIG. 1 indicates the image processing unit 1. A CPU (Central Processing Unit) 11 controls the various units in the image processing unit 1 by reading out and executing a computer program (called simply a "program" hereinafter) stored in a ROM (Read Only Memory) 12. For example, the CPU 11 functions as an image region dividing unit and a color change number counting unit, which will be described later. The ROM 12 is a read-only non-volatile storage device configured of a semiconductor element or the like. Various programs, a BIOS (Basic Input/Output System), and so on are stored in the ROM 12. A RAM (Random Access Memory) 13 is used as a working area when the CPU 11 executes programs. Furthermore, the RAM 13 includes a region for storing data representing vector images (called "vector image data" hereinafter) and data representing raster images (called "raster image data" hereinafter). Note that a data compression process may be executed on this data that represents images. A VRAM (Video RAM) 14 is a RAM that stores raster image data. An input unit 15 serves as an interface with an external input apparatus, such as a scanner, a computer, or the like, and receives image data under the control of the CPU 11. Here, the input unit 15 receives raster image data inputted from the scanner 2. An output unit 16 outputs image data to the image forming unit, an external device such as a liquid-crystal display medium, or the like, under the control of the CPU 11. Here, the output unit 16 outputs image data to the image forming unit 3. The various units within the image processing unit 1 are connected to one another via a bus.

Figure 2:
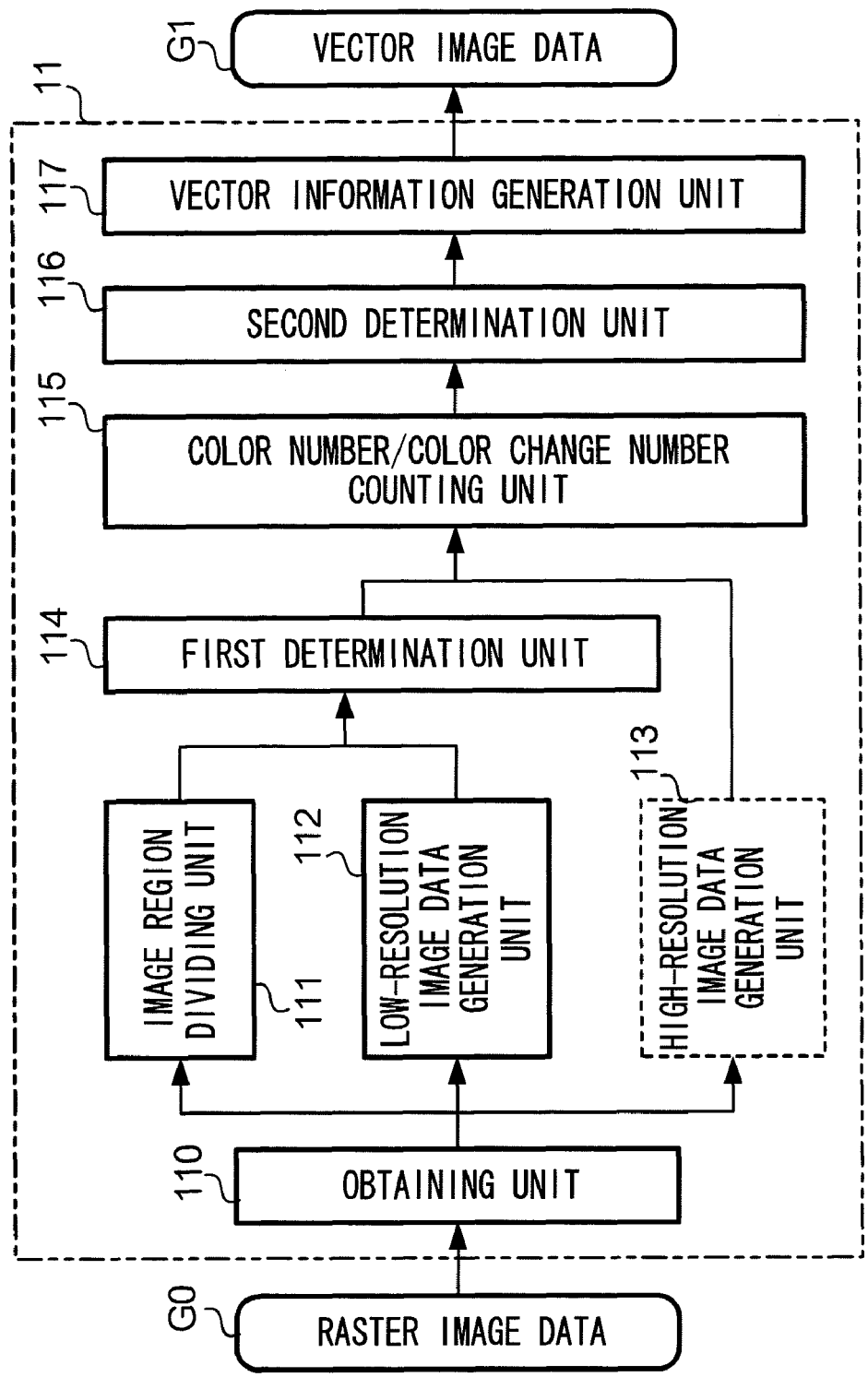
FIG. 2 shows a block diagram illustrating the functional configuration of an image processing unit.

FIG. 2 shows a block diagram illustrating a functional configuration of the image processing unit 1. The units surrounded by the double-dot-dash line in FIG. 2 represent functions implemented by the CPU 11 of the image processing unit 1. Raster image data G0 is obtained by an obtaining unit 110, and is supplied to an image region dividing unit 111, a low-resolution image data generation unit 112, and a color number/color change number counting unit 115.

The image region dividing unit 111 is a unit that divides an image represented by the supplied raster image data G0 into a single image region or multiple image regions in which an image has been rendered through a labeling process. Brightness, luminance, or the like are used in this labeling process.

The low-resolution image data generation unit 112 generates image data with a resolution that is lower than the resolution of the supplied raster image data G0 (called "low-resolution image data" hereinafter). For example, if the resolution of the supplied raster image data G0 is 1200 dpi, low-resolution image data having a resolution of 600 dpi is generated. In this case, the resulting resolution is half the original resolution, and therefore a single pixel in the low-resolution image data corresponds to 2×2, or 4, pixels of the original raster image data G0. Here, the low-resolution image data is generated by the CPU 11 isolating 4 pixels in the raster image data G0 located in a predetermined position, such as, for example, the "upper left" position, and using those pixels as a single pixel for the corresponding low-resolution image data. Note that when generating the pixels of the low-resolution image data, the pixel values of the new pixels may be calculated based on the values of each of the pixels using a predetermined calculation method, rather than isolating a single pixel in a predetermined position from among the pixels corresponding to the raster image data G0. For example, the CPU 11 may calculate an "average value" obtained by rounding off the arithmetic mean of each of the pixel values, and generate a new pixel that has that average value as its pixel value.

Note that hereinafter, the supplied raster image data G0 will be called "high-resolution image data", referring to the fact that it is of a higher resolution than the low-resolution image data.

A first determination unit 114 uses an image region into which the image has been divided by the image region dividing unit 111 and the low-resolution image data generated by the low-resolution image data generation unit 112 to determine the attributes of the image to be rendered in that image region, or in other words, the attributes of a region image. To be more specific, the CPU 11 extracts, from the low-resolution image data, the image data of a portion corresponding to that image region, and generates a histogram indicating numbers per class of the pixel values, for the pixel values of each pixel in the extracted image data. Then, the CPU 11 determines the attributes of the stated region image based on the class of the pixel value. Here, the "pixel value" may be a pixel value indicating color, or maybe a pixel value in which only the brightness, saturation, or the like has been extracted. Furthermore, with respect to pixel value classes, a single pixel value may be associated with a single class, or a range including predetermined lower and upper limits for the pixel values may be used as a pixel value class. The "attributes" of a region image indicate whether the image is a text image, a vector image, or a photographic image. Here, for example, the attributes of a region image in which the number of colors is less than a (where a is a positive integer (for example, a=3)) are determined to be "text image", the attributes of the region image in which the number of colors is greater than or equal to a but less than b (where b is an integer greater than a (for example, b=256)) are determined to be "vector image", and the attributes of the region image in which the number of colors is greater than or equal to b is determined to be "photographic image".

The first determination unit 114 uses the low-resolution image data, whose data amount is less than that of the high-resolution image data, and therefore a smaller amount of processing is necessary to perform the stated determination than when determining the attributes of the region image using the high-resolution image data.

The color number/color change number counting unit 115 uses the results of the determination performed by the first determination unit 114 and the high-resolution image data. To be more specific, the color number/color change number counting unit 115 performs the following two processes only in the case where the results of the determination performed by the first determination unit 114 indicate that the attributes of that region image are "vector image". The first process is a process in which the CPU 11 generates a histogram for the high-resolution image data corresponding to an image region obtained through the division performed by the image region dividing unit 111, and counts the number of colors of which the high-resolution image data is composed (called "composition colors" hereinafter) based on the number of classes indicated in the histogram. In other words, the CPU 11 that performs this first process functions as a color number counting unit that, in the case where the first determination unit 114 has determined that the image region is an image region for a vector image, counts the number of colors in the pixels of high-resolution image data representing the image included in that image region, the high-resolution image data having a resolution that is higher than the low-resolution image data.

The second process is a process in which the CPU 11 counts the number of times the color of continuous pixels has changed (called "color change number" hereinafter) within an image region obtained through the division performed by the image region dividing unit 111, in an image rendered by the high-resolution image data. Here, "the color of continuous pixels within an image region changing" refers to the concept described hereinafter. First, the CPU 11 targets a certain pixel within an image region, and then calculates the difference between the color of that target pixel and the color of at least one pixel located within a predetermined range from that target pixel (for example, a range encompassing the pixels immediately adjacent to that target pixel). The CPU 11 then compares this calculated difference with a predetermined threshold, and if the difference is greater than or equal to the threshold, the CPU 11 determines that "the color has changed". The CPU 11 counts the "color change number" by counting the number of times "the color has changed" for all pixels within an image region. In other words, the CPU 11 that performs this second process functions as a frequency counting unit that, in the case where the first determination unit 114 has determined that the image region is an image region for a vector image, counts the number of times where the difference between the colors of each of the pixels in the high-resolution image data and the colors of at least one pixel located around each of those pixels is greater than or equal to a threshold.

A second determination unit 116 determines, once again, the attributes of a region image that was determined by the first determination unit 114 to be a "vector image", using the number of composition colors and the color change number counted by the color number/color change number counting unit 115. To be more specific, the CPU 11 determines whether or not the combination of the color change number and the number of composition colors meets predetermined conditions. Here, the "predetermined conditions" refers to conditions indicating that the attributes of the region image as determined by the first determination unit should be corrected, and are thus called "correction conditions". Therefore, if the combination of the color change number and the number of composition colors meets these correction conditions, the CPU 11 determines that the attributes of the region image are to be corrected to "photographic image", whereas if the combination does not meet the correction conditions, the attributes of the region image are determined to be "vector image".

Because the second determination unit 116 uses high-resolution image data, whose data amount is greater than that of the low-resolution image data, the accuracy of the determination of the attributes of the region image is greater than if the determination is carried out using the low-resolution image data. Note that because the number of composition colors and color change number in a vector image are often less than those in a photographic image, the second determination unit 116 distinguishes between the two types of images by comparing the number of composition colors and color change number to a threshold, as described above.

A vector information generation unit 117 vectorizes only region images whose attributes have been determined by the second determination unit 116 to be "vector image", thereby generating vector information for rendering the region images according to the vector system. To be more specific, if the attributes of the region image as determined by the second determination unit 116 are "vector image", the CPU 11 specifies high-resolution image data corresponding to the image regions obtained through the division performed by the image region dividing unit 111. Then, the CPU 11 executes processes such as edge extraction on the specified high-resolution image data, thereby generating vector information representing the processes for rendering each of the elements to be rendered, such as lines, surfaces, and text, as numerical values, numerical formulas, and the like; the CPU 11 then collects this vector information and outputs the information as vector image data G1 represented in a vector graphic language, such as, for example, SVG (Scalable Vector Graphics). Note that "edge extraction" refers to a process, such as that disclosed in JP-A-7-99581, in which, for example, edges are extracted by obtaining difference values in the vertical and horizontal directions on a pixel-by-pixel basis for the values of pixels that compose a raster image and comparing the obtained difference values to a predetermined threshold.

3. Operations

The operations of the image forming apparatus 10, serving as an exemplary embodiment of the present invention, will now be described. FIG. 3 is a flowchart illustrating the flow of operations performed by the CPU 11 in the image processing unit 1. First, raster image data sent from the scanner 2 is received by the input unit 15, and is inputted to the CPU 11 via the bus. In other words, the CPU 11 obtains raster image data and temporarily stores that data in the RAM 13 (step S101). Next, the CPU 11 compares each pixel in the obtained raster image data to a predetermined threshold, and generates binary image data composed of two values, indicating pixels that exceed the threshold, and pixels that do not exceed the threshold (step S102). Then, the CPU 11 adds a label to "pixels that exceed the threshold" that are adjacent to each other based on the binary image data generated in step S102, and performs a labeling process (step S103). Next, the CPU 11 divides the image, based on the results of the labeling process, into rectangles that circumscribe groups of pixels that have the same label (concatenated components), or in other words, into image regions (step S104). Note that the CPU 11 functions as the obtaining unit 110 when performing the processing of the aforementioned step S101, and functions as the image region dividing unit 111 when performing the processing of the aforementioned steps S102, S103, and S104.

Once the image has been divided into image regions in step S104, the CPU 11 commences sequential processes for one or more of the image regions into which the image has been divided. First, the CPU 11 specifies the raster image data corresponding to that image region as high-resolution image data (step S105). Next, the CPU 11 generates, from the specified high-resolution image data, low-resolution image data whose resolution is lower than the resolution of the high-resolution image data (step S106). In other words, the CPU 11 functions as the low-resolution image data generation unit 112 when performing the processing in step S105. Then, the CPU 11 counts the pixel values for each pixel in the generated low-resolution image data, and calculates a first histogram indicating the numbers for the classes of pixel values (step S107). Through this, a first number of composition colors (called a "first composition color number"), indicating the colors used in that image region in the low-resolution image data, is specified by the CPU 11. Next, the CPU 11 compares the specified first composition color number with two thresholds "a" and "b", and proceeds according to whether the first composition color number is less than a, greater than or equal to b, or greater than or equal to a but less than b (step S108). In other words, the CPU 11 functions as the first determination unit 114 when performing the processes of step S107 and S108.

If the first composition color number is less than a, the CPU 11 determines that the attributes of the region image are "text image", and performs text processing on the high-resolution image data specified in step S105 (step S109). Here, "text processing" refers specifically to a process for identifying character codes and font names by performing a pattern matching process, for matching text with pre-stored text shapes, on the stated region image.

Meanwhile, if the first composition color number is greater than or equal to b, the CPU 11 determines that the attributes of the region image are "photographic image", and performs photographic processing on the high-resolution image data specified in step S105 (step S110). Here, "photographic processing" refers specifically to a process for performing, on the stated region image, an irreversible compression process, thereby converting the data into data in a format suitable for photographic images, such as, for example, the JPEG (Joint Photographic Experts Group) format.

Finally, if the first composition color number is greater than or equal to a but less than b, the CPU 11 determines that the attributes of the region image are "vector image", and performs the following processing. First, the CPU 11 counts the pixel values for each pixel in the high-resolution image data specified in step S105, and calculates a second histogram indicating numbers for the classes of pixel values (step S111). Through this, a second number of composition colors (called a "second composition color number"), indicating the colors used in that image region in the high-resolution image data, is counted by the CPU 11. Then, the CPU 11 counts the number of times the color of continuous pixels has changed, or the "color change number", within the image region, using the high-resolution image data (step S112). In other words, the CPU 11 functions as the color number/color change number counting unit 115 when performing the processes in steps S111 and S112.

Next, the CPU 11 determines whether or not the counted "color change number" and the "second composition color number" meet the predetermined correction conditions, thereby determining, once again, the attributes of the region image already determined in step S108 to be a vector image (step S113). In other words, the CPU 11 functions as the second determination unit 116 when performing the process of step S113. The correction conditions are stored, in advance, in the ROM 12 or the like. FIG. 4 is a diagram illustrating these correction conditions. As shown in FIG. 4, the second composition color number is divided into a column "<Th1", indicating the number is less than a predetermined threshold "Th1", or in other words, is less than Th1, and a column "≧Th1", indicating the number is greater than or equal to Th1 (that is, the same as Th1 or more than Th1). Meanwhile, the color change number is divided into a row "<Th2", indicating the number is less than a predetermined threshold "Th2", or in other words, is less than Th2, and a row "≧Th2", indicating the number is greater than or equal to Th2 (that is, the same as Th2 or more than Th2). These correction conditions specify that the attributes of a region image should be corrected from "vector image" to "photographic image" except in the case where the second composition color number is "<Th1" and the color change number is "<Th2". In other words, if at least one of the second composition color number and the color change number counted by the color number/color change number counting unit 115 for an image region determined by the first determination unit 114 to be a vector image is greater than its respective threshold, the CPU 11 determines that that image region is not a vector image.

If it is determined that the "color change number" and the "second composition color number" meet the predetermined correction conditions (step S113; YES), the CPU 11 corrects the determination of the attributes of that region image to "photographic image", and performs the photographic processing indicated in step S110 on the high-resolution image data specified in step S105. However, if it is determined that the "color change number" and "second composition color number" do not meet the predetermined correction conditions (step S113; NO), the CPU 11 determines that the attributes of that region image are "vector image", and performs, on the high-resolution image data specified in step S105, a vectorizing process that generates vector information for rendering a "vector image" (step S114). In other words, the CPU 11 functions as the vector information generation unit 117 when performing the process of step S114.

When steps S109, S110, or step S114 have ended, the CPU 11 determines whether any unprocessed image regions, which are image regions that have not yet been processed, remain (step S115). If it is determined that an unprocessed image region remains (step S115; YES), the CPU 11 returns to the process in step S105, and performs the processes from step S105 on the unprocessed image region. However, if it is determined that there are no unprocessed image regions (step S115; NO), the CPU 11 ends the processing.

By using the low-resolution image data as described above, in step S108, the CPU 11, functioning as the first determination unit 114, determines the attributes of each region image faster than when using high-resolution image data. However, because the accuracy of such determination is lower than when using high-resolution image data, there are cases where the CPU 11 mistakenly determines that a photographic image, the vectorization of which is difficult, is a vector image, in the aforementioned step S108. If vectorization is performed on a region image mistakenly determined in such a manner, there are cases where a massive amount of complex vector information that cannot easily be reused is generated, leading to a large increase in the processing load. Therefore, with the image forming apparatus 10 as described above, even if the CPU 11, functioning as the first determination unit 114, makes this kind of mistaken determination, the CPU 11, functioning as the second determination unit 116, performs a highly accurate determination using high-resolution image data, thereby correcting the inaccurate determination performed by the first determination unit 114. As a result, the likelihood that an image region that is originally supposed to be processed as a photographic image mistakenly undergoes vectorization processing, thereby increasing the processing load, is low.

4. Variations

While an exemplary embodiment of the invention has been described above, the content of that exemplary embodiment can be altered in the following ways. The following variations may also be combined.

(1) Although in the aforementioned exemplary embodiment, the correction conditions are set as the case where at least one of the "color change number" and the "second composition color number" are greater than respective thresholds, and those thresholds, or "Th1" and "Th2", are determined individually, "Th1" and "Th2" may be determined so as to be dependent on each other. In this case, for example, one of "Th1" and "Th2" may be defined as a function that is determined by the other.

(2) When calculating the second histogram in step S111, the image region being targeted may be divided into multiple regions in accordance with a predetermined method/number, and histograms may be calculated for each of the regions into which the image region has been divided (called "divided regions" hereinafter). For example, assume that during the image region division performed in step S104, two or more image regions that originally should have been divided into separate image regions were not divided into separate image regions in such a manner because they are adjacent to each other. Even in a case such as this, for example, the CPU 11 may determine the lengthwise direction of that image region, divide the image region into two image regions at the center of that lengthwise direction, and then calculate histograms for each of the divided regions. The CPU 11 may then determine whether or not to correct the attribute determination results for each of those divided regions. Through this, even when an image that originally should be determined to be a photographic image is present within one of the divided regions, the correction conditions can be determined for that divided region; therefore, photographic processing is executed more frequently on image regions that are originally supposed to be processed as photographic images.

(3) In the above exemplary embodiment, the CPU 11 specifies, in step S105, high-resolution image data corresponding to an image region obtained through the division performed in step S104; however, high-resolution image data, having a resolution that is higher than the resolution of low-resolution image data, may instead be generated from the raster image data obtained in step S101. For example, a high-resolution image data generation unit 113 indicated by the broken line in FIG. 2 generates, from the raster image data G0, high-resolution image data whose resolution is lower than the resolution of that raster image data but is higher than the resolution of the low-resolution image data. There are, however, cases where the image resolution that the image forming unit 3 of the image forming apparatus 10 is capable of outputting is lower than the resolution of the raster image data obtained by the CPU 11. In such a case, performing processing according to the resolution of the raster image data results in an unnecessary processing load. By providing the aforementioned high-resolution image data generation unit 113, the resolution of the high-resolution image data used by the second determination unit is set according to the capabilities of the image forming unit 3, thereby suppressing unnecessary processing loads. Note that the image forming unit 3 and input unit 15 may be connected, and the CPU 11 may then receive, from the image forming unit 3 and via the input unit 15, instruction information instructing the use of the resolution of the high-resolution image data or the resolution of the low-resolution image data.

(4) Although in the aforementioned exemplary embodiment, the image processing unit 1 was provided within the image forming apparatus 10, the image processing unit 1 may be realized by a personal computer.

Furthermore, although the units surrounded by the double-dot-dash line in FIG. 2 are functions implemented by the CPU 11 of the image processing unit 1, those units may be realized by an entity aside from the CPU 11. For example, the low-resolution image data generation unit 112 may be implemented by a dedicated image processing processor that generates low-resolution image data from inputted raster image data.

(5) Although in the aforementioned exemplary embodiment, the CPU 11 (vector information generation unit 115) performs vectorization without changing the composition colors, a process for reducing the composition colors of the raster image data to colors used in rendering (called "rendering colors" hereinafter) may be performed prior to the vectorization process. The algorithm for the process for reducing the composition colors to rendering colors is, for example, as denoted below in steps S201 to S207.

Step S201: a low-frequency color is merged with colors similar to that color but which also have a higher frequency than that color, based on a calculated histogram.

Step S202: the process ends if the number of composition colors is less than or equal to the target number of colors for the rendering colors.

Step S203: those colors are taken as a single color group, and the pair of colors with the highest color difference is obtained.

Step S204: the target group is divided into two with preference being given to color difference.

Step S205: the process ends if the number of groups is less than or equal to a target number.

Step S206: the group having the maximum color difference pair is obtained from all the groups.

Step S207: the process returns to step S204.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
a processor;
an obtaining unit, executed on the processor, that obtains original image data representing a color of each pixel included in an image;
a dividing unit that divides the image represented by the original image data obtained by the obtaining unit into a plurality of image regions through a labeling process;
a low-resolution image data generation unit that generates low-resolution image data representing the image at a lower resolution than the resolution of the original image data;
a first determination unit that determines whether each of the image regions divided by the dividing unit is an image region for a vector image, based on a characteristic amount of the image represented by the low-resolution image data generated by the low-resolution image data generation unit, the vector image being an image where the process for rendering the image is defined by numerical values or numerical formulas;
a color number counting unit that, in a case where the first determination unit has determined that the image region is an image region for a vector image, counts the number of colors in the pixels of high-resolution image data representing the image included in the image region, the high-resolution image data having a resolution that is higher than the low-resolution image data;

a frequency counting unit that, in a case where the first determination unit has determined that the image region is an image region for a vector image, counts a number of times where the difference between the colors of each of the pixels in the high-resolution image data and the colors of at least one pixel located around each of those pixels is greater than or equal to a first threshold;

a second determination unit that, in a case where at least one of the number counted by the color number counting unit and the number of times counted by the frequency counting unit in the image region determined by the first determination unit to be an image region for a vector image is greater than a second threshold, determines that the image region is not an image region for a vector image; and a generation unit that generates image data in which a process for rendering images in the image regions determined by the first determination unit to be image regions for vector images, but excluding the image regions determined by the second determination unit to not be image regions for vector images, is defined by numerical values or numerical formulas.

2. The image processing apparatus according to claim 1, wherein the generation unit generates image data in which a process for rendering images in the image regions determined by the first determination unit to be image regions for vector images, but excluding the image regions determined by the second determination unit to not be image regions for vector images, is defined by numerical values or numerical formulas using a number of colors less than the number of colors counted by the color number counting unit.

3. The image processing apparatus according to claim 1, further comprising:

an image dividing unit that divides an image region determined by the first determination unit to be an image region for a vector image into a plurality of image sub-regions in accordance with a predetermined procedure, wherein the color number counting unit counts, for each image sub-region obtained through the division performed by the image dividing unit, the number of colors in the pixels of high-resolution image data representing the image included in each of those image sub-regions at a resolution higher than the resolution of the low-resolution image data;

the frequency counting unit counts; for each image sub-region obtained through the division performed by the image dividing unit, the number of times where the difference between the colors of each of the pixels in the high-resolution image data and the colors of at least one pixel located around each of those pixels is greater than or equal to a threshold; and the second determination unit determines, for each image sub-region obtained through the division performed by the image dividing unit, that the image sub-region is not an image region for a vector image in the case where at least one of the number counted by the color number counting unit and the number of times counted by the frequency counting unit in the image sub-region is greater than a threshold.

4. An image forming apparatus comprising:

the image processing apparatus according to claim 1;

an input unit that inputs, into the image processing apparatus, the original image data obtained by the obtaining unit of the image processing apparatus; and an image forming unit that forms an image onto a recording medium using the image data generated by the generation unit of the image processing apparatus.

5. The image processing apparatus of claim 1, wherein the color number counting unit counts the number of colors in the pixels of high-resolution image data representing the image included in the image region only for those image regions determined by the first determination unit to be an image region for the vector image.

6. The image processing apparatus of claim 5, wherein the frequency counting unit counts the number of times where the difference between the colors of each of the pixels in the high-resolution image data and the colors of at least one pixel located around each of those pixels is greater than or equal to the first threshold only for those image regions determined by the first determination unit to be an image region for the vector image.

* * * * *